Dec. 23, 1924. 1,520,667
R. OINES
DISHWASHING MACHINE
Filed Sept. 30, 1922  3 Sheets-Sheet 1

R. Oines
INVENTOR
BY Victor J. Evans
ATTORNEY

Dec. 23, 1924.

R. OINES

DISHWASHING MACHINE

Filed Sept. 30, 1922    3 Sheets-Sheet 2

1,520,667

R. Oines
INVENTOR

BY Victor J. Evans
ATTORNEY

Dec. 23, 1924.

R. OINES

DISHWASHING MACHINE

Filed Sept. 30, 1922

R. Oines
INVENTOR

BY Victor J. Evans
ATTORNEY

Patented Dec. 23, 1924.

1,520,667

UNITED STATES PATENT OFFICE.

RAGNA OINES, OF ARLINGTON, SOUTH DAKOTA.

DISHWASHING MACHINE.

Application filed September 30, 1922. Serial No. 591,572.

*To all whom it may concern:*

Be it known that I, RAGNA OINES, a citizen of the United States, residing at Arlington, in the county of Kingsbury and State of South Dakota, have invented new and useful Improvements in Dishwashing Machines, of which the following is a specification.

This invention contemplates the provision of a dish washing machine, by means of which a large number of dishes can be entirely cleaned in quick order, and with the expenditure of a minimum amount of effort.

More specifically stated, the invention provides a machine of the above mentioned character including a casing divided into a dish receiving compartment and a water receiving compartment, with a water wheel arranged to operate in the latter mentioned compartment so as to direct the water against one wall of the casing, from where the water flows over the dishes arranged in their respective compartment, the circulation of the water being such as to effectively clean the dishes in quick order.

Another object of the invention resides in providing a dish rack which is constructed with means to accommodate the various shaped dishes, cups, knives, forks and the like, and which tray is susceptible of being easily positioned within the dish compartment or removed therefrom as the occasion requires.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 4 is a plain view of the machine with the cover removed.

Figure 5 is a fragmentary view of the water wheel.

Figure 1:
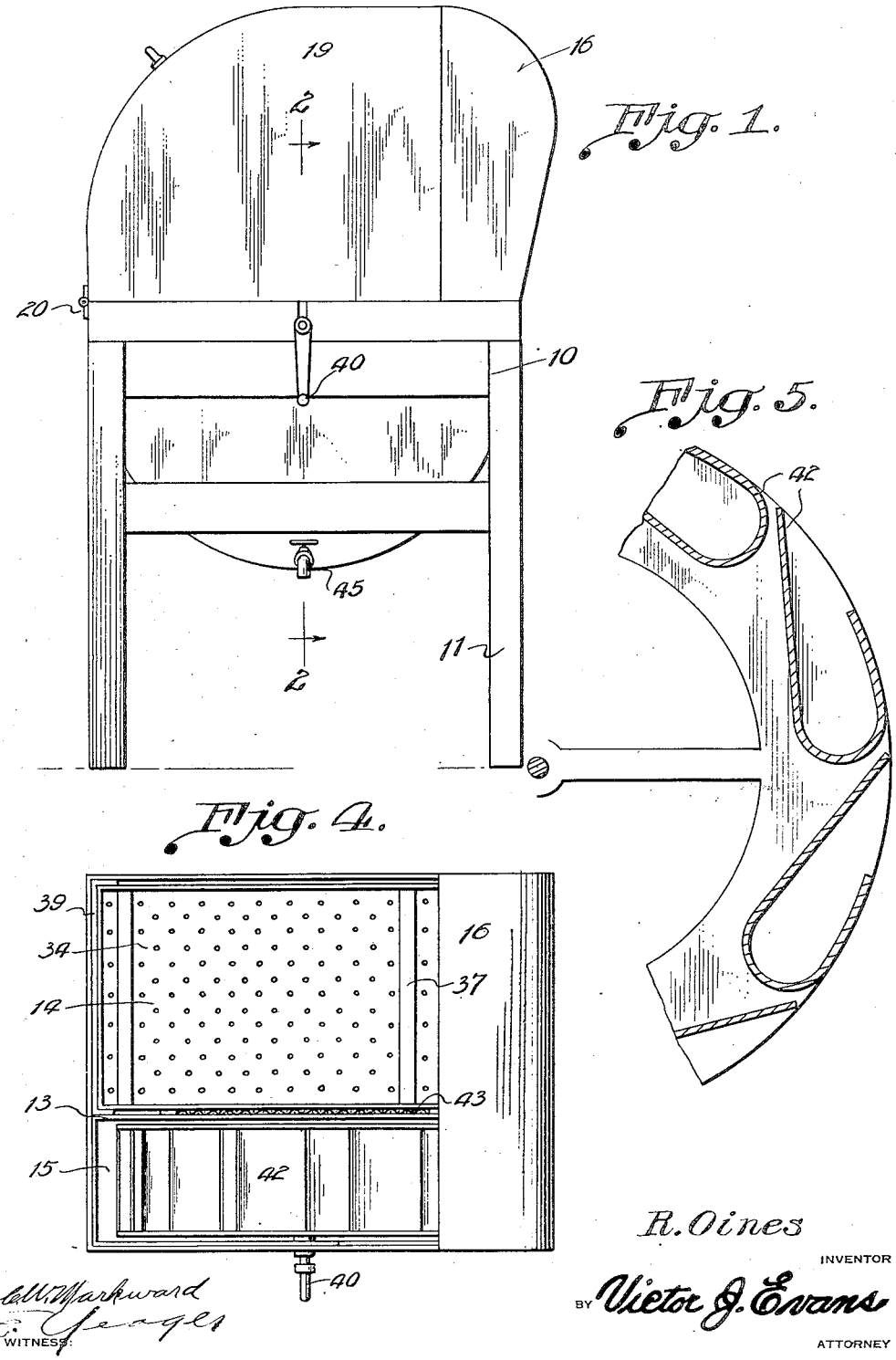
Figure 1 is a view in elevation of the machine constructed in accordance with the invention.
Figure 2:
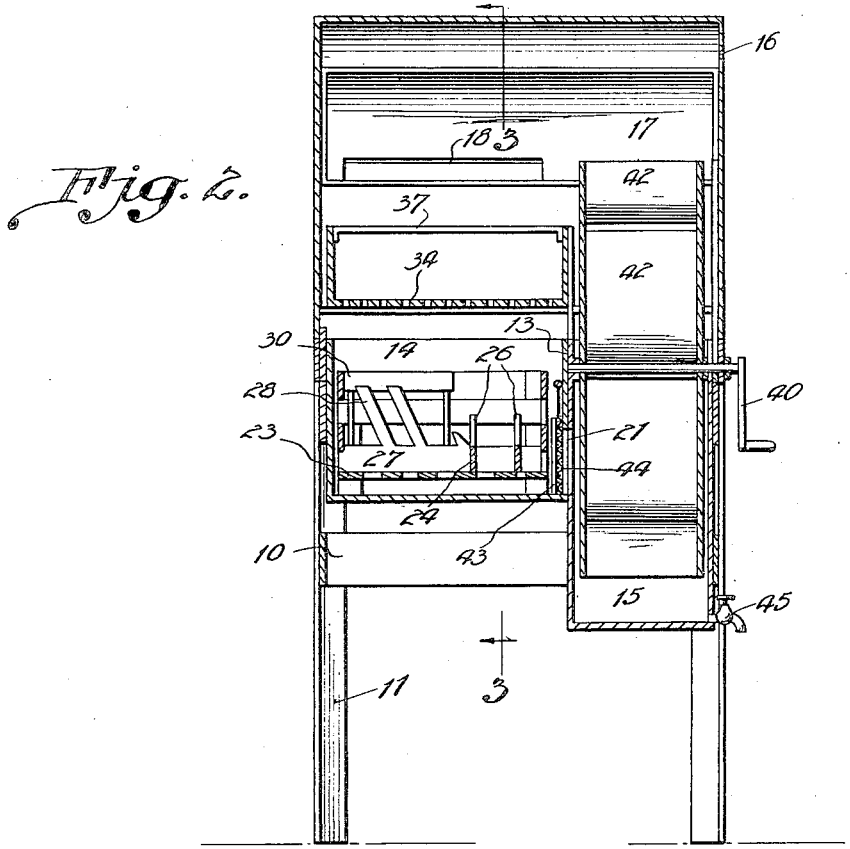
Figure 2 is a sectional view taken on line 2—2 of Figure 1.
Figure 7:
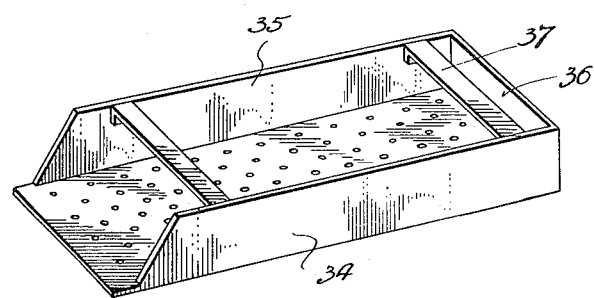
Figure 7 is a detailed view of the tray.
Figure 3:
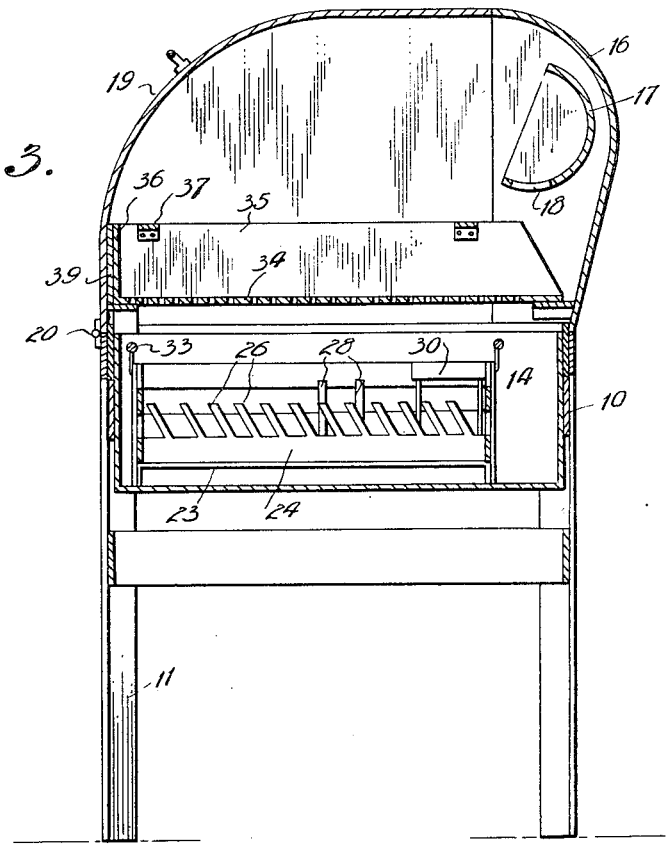
Figure 3 is a sectional view taken on line 3—3 of Figure 2.
Figure 6:
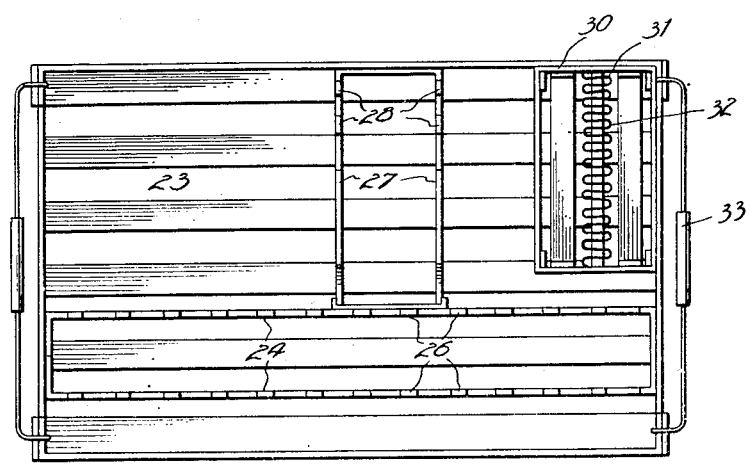
Figure 6 is a detailed view of the dishrack.

Referring to the drawings in detail, 10 indicates a casing which may vary in size and configuration without departing from the spirit of invention, the casing being preferably supported by legs 11. The casing is divided by a vertical partition 13 into a dish receiving compartment 14, and a water compartment 15, the latter being of semi-cylindrical formation and projecting an appreciable distance below the bottom of the dish compartment 14. One end wall of the casing extends a considerable distance above the water wheel and the respective compartments above mentioned and is slightly curved at its top, this wall being indicated at 16. Mounted between the side portions of this wall is a water receiving trough 17, which is longitudinally slotted as at 18 for that portion of its length which extends across the width of the dish receiving compartment 14. The casing is provided with a cover 19 which is suitably curved, or shaped to cover the top of the casing, and while this cover may be removable, it is preferably pivoted as at 20, so that it can be conveniently swung to an opened position as the occasion may require. The partition 13 is provided with a longitudinal slot 21 to establish communication between the respective compartments 14 and 15 for the purpose to be hereinafter described.

In accordance with the present invention, I provide a dish rack clearly illustrated in the drawings, and which rack is of basket-like formation and indicated generally at 23. Arranged within this basket are spaced parallel members 24, from which rise spaced fingers 26, the latter being disposed at a slight inclination so as to properly support plates or the like as will be readily understood.

Arranged at one side of the parallel members 24 are spaced parallel members 27, which extend transversely across the rack and rising from these members 27 are spaced fingers 28 of relatively different length, to support plates or dishes of different configurations, such as platters and poato dishes. Arranged in one corner of the basket-like rack is a frame-like structure 30, which supports a holder 31 for knives, spoons, forks and the like, the holder being preferably formed from a single length of wire of resilient nature, bent upon itself to provide oppositely disposed clamping loops 32 which receive the articles above mentioned. These articles are arranged vertically within the frame-like member 31. The dish rack is provided with handles 33 at the ends thereof, through the instrumentality of which the rack can be conveniently lifted to be positioned within the compartment 14 or removed therefrom as the occasion requires.

The machine also embodies a tray 34, which is provided with a perforated bottom and parallel side walls 35 and one end wall 36. Consequently, the tray is opened at one end, and this open end is adapted to be arranged immediately beneath the slot in the water receiving trough above referred to. The tray is also provided with handles 37, so that the tray can be conveniently positioned within the casing or removed therefrom when desired. Rising from one end wall of the casing is a substantially U-shaped bracket 39, which receives the tray and assists in supporting it in position immediately above the dish rack as illustrated. In practice, the dishes are arranged in the dish rack in a manner above described, the space in one corner of the rack being provided to receive the cups.

The dish rack is then arranged within the compartment 14, after which the tray is positioned within the casing in a manner just described. Hot water with a proper amount of soap is then poured over the tray, the water passing through the perforations of the tray onto the dishes contained in the compartment 14, and also finding its way into the compartment 15, through the slot in the side in the partition which defines the compartments. If desired, a quantity of soap can be arranged in the water receiving trough. The cover is then arranged in its closed position. It is now only necessary to rotate the water wheel which operates in the compartment 15, a handle 40 being provided for this purpose. As the wheel is rotated, the buckets 42 forming part of the wheel convey the water from the compartment 15 against the end wall of the casing which rises above the wheel as above described, and the water is deflected from this wall into the water trough and then onto the perforated tray where it again enters the compartment 14. As above pointed out, the open end of the tray is arranged directly beneath the water trough for this purpose. This operation is continued to promote circulation of the water until such time as the dishes have been properly cleaned. The construction and operation is such that the large number of dishes can be cleaned in this manner in very quick order. The partition 13 is provided with spaced holders 43 arranged at the opposite ends of the slot 21 in said partition, and these holders are adapted to support a cleaning element 44 in contact with the partition 13 in a position to cover the slot 18.

After the dishes have been cleaned in a manner described, the water from the casing is exhausted through the valve 45 arranged adjacent the bottom of the compartment 15. Clean water is then introduced into the casing to rinse the dishes, and if desired, the water wheel may be turned one or two times for this purpose, and this second water subsequently exhausted from the casing in a manner stated. The dishes are then allowed to remain in the casing a short time during which period they dry.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A dish washing machine comprising a casing, a partition dividing said casing into a dish receiving compartment and a water receiving compartment, an end wall projecting above said compartments, a dish rack adapted to be positioned in the dish compartment, a water wheel arranged to operate in the other compartment for throwing water from said compartment against said end wall, a trough supported by said end wall and opening into the dish compartment, and said partition having a slot establishing communication between the compartments for the purpose specified.

2. A dish washing machine comprising a casing, a partition dividing the casing into separate compartments and having a slot establishing communication between said compartments, an end wall rising from the casing and curved to overlie a part of the compartments, a trough supported by said end wall and having a slot opening into one of said compartments, a dish rack adapted to be arranged in the last mentioned compartment, a perforated tray supported by the casing above the said rack and extended beneath the opening in said trough, a water wheel operating in the other of said compartments, and including buckets for conveying water from said compartment and directing it against said end wall, and means for rotating said wheel.

3. A dish washing machine comprising a casing, a partition dividing the casing into separate compartments and having a slot establishing communication between the compartments, and an end wall rising from the casing and slightly curved to overlie said compartments, a trough supported by said end wall and having an opening communicating with one of the compartments, a dish rack adapted to be supported in the last mentioned compartment and including a basket-like receptacle, supports arranged within the receptacle for supporting the dishes and other utensils, a bracket rising from the other end wall of the casing, a perforated tray supported by the bracket above the dish rack and having one end extended beneath the slot in said trough for the purpose specified, a water wheel operating in the other of said compartments and including buckets for carrying the water from the compartment against said end wall, and means for rotating said wheel.

In testimony whereof I affix my signature.

RAGNA OINES.